Dec. 4, 1962  R. A. WALDRON  3,067,395
BROAD BAND FARADAY ROTATORS
Filed Oct. 7, 1959

Inventor:
Richard Arthur Waldron
BY
Baldwin & Wight
attorneys

United States Patent Office 3,067,395
Patented Dec. 4, 1962

3,067,395
BROAD BAND FARADAY ROTATORS
Richard Arthur Waldron, Great Baddow, England, assignor to Marconi's Wireless Telegraph Company Limited, London, England, a company of Great Britain
Filed Oct. 7, 1959, Ser. No. 844,917
Claims priority, application Great Britain June 3, 1959
5 Claims. (Cl. 333—24)

This invention relates to broad band Faraday rotators and more specifically to broad band Faraday rotators of the kind operating in the so-called $H_{11}$ mode of wave propagation utilising so-called Faraday rotation and comprising a length of circularly sectioned waveguide with an inner length of coaxially positioned circularly sectioned gyro-magnetic material which is subjected to a substantially longitudinal magnetic field. Devices of this kind are well known, the gyro-magnetic material being usually ferrite. The space between the inner length and the wall of the guide may be filled with any suitable dielectric, e.g. air or a low loss solid dielectric. Devices of the kind are used for a variety of purposes, e.g. in isolators or in circulators, the Faraday rotation being chosen to suit the particular purpose in each case.

The main object of the present invention is to provide improved devices of the kind referred to wherein the ratio of the ferrite diameter to the waveguide diameter is such that the amount of Faraday rotation shall be approximately independent of frequency over a wide range of frequencies. Theory indicates that, in practice, an approximate independence of frequency over a frequency range of well over 10% of the said frequency is obtainable by the invention.

Figure 1:
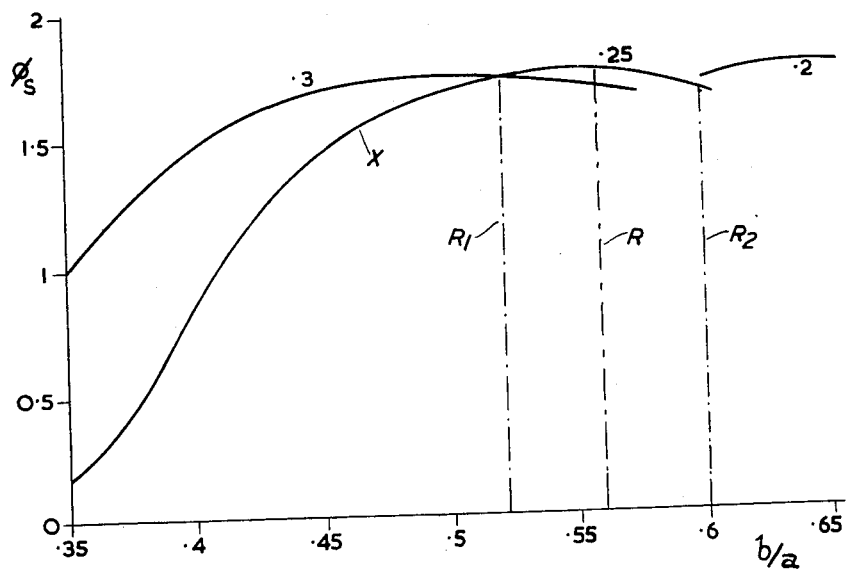
Figure 2:
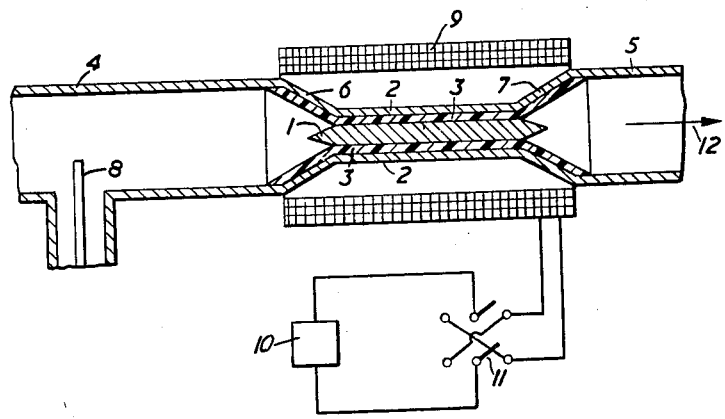

The invention is illustrated in and explained in connection with the accompanying drawings in which FIG. 1 is an explanatory graphical figure and FIG. 2 is a simplified part-sectional part-diagrammatic representation of one embodiment.

Before describing the present invention certain terms and quantities will first be defined. The first of these is "specific rotation" ($\phi_s$). By "specific rotation" is meant the actual Faraday rotation produced per unit length of device where the unit of length is the wave-length ($\lambda_0$) in an unbounded quantity of whatever material (commonly, though not necessarily, air) is used as the dielectric "filling" between the "core" (the ferrite or other gyro-magnetic body in the guide) and the guide. Thus if $\phi_s$ is measured in units of $\pi$ in a length of device $\lambda_0$ we may write $$\phi_s = \bar{\beta}_1 - \bar{\beta}_2 \quad (1)$$

In this expression $\bar{\beta}_1$ and $\bar{\beta}_2$ are related to $\beta_1$ and $\beta_2$ respectively where $$\beta_1 = \frac{2\pi}{\lambda_1} \quad (2)$$

and $$\beta_2 = \frac{2\pi}{\lambda_2} \quad (3)$$

where $\lambda_1$ is the wave-length in the device of a wave having one direction of rotation as regards its polarisation and $\lambda_2$ is the wave-length in the device of the wave having the opposite direction of rotation as regards its polarisation. The relation between $\bar{\beta}_1$ and $\beta_1$ and between $\bar{\beta}_2$ and $\beta_2$ is given by $$\bar{\beta}_1 = \frac{\lambda_0 \beta_1}{2\pi} = \frac{\lambda_0}{\lambda_1} \quad (4)$$

and $$\bar{\beta}_2 = \frac{\lambda_0 \beta_2}{2\pi} = \frac{\lambda_0}{\lambda_2} \quad (5)$$

The other terms and quantities for preliminary definition are:

$a=$internal radius of the guide
$b=$radius of the gyro-magnetic core
$b/a=$radius ratio
$a/\lambda_0=$the normalised guide radius
$\epsilon=$permittivity of the D core material relative to the permittivity of the dielectric filling material
$\mu=$the diagonal element of the relative permeability of the core material and
$k=$the off-diagonal element of the relative permeability of the core material The present invention secures its object by a particular choice of the ratio $b/a$. Suppose, for the moment, that the wave-guide is empty, i.e. take the extreme theoretical case in which $b/a=0$. Then, if $a/\lambda_0$ is large enough for wave propagation to occur, the Faraday rotation is zero. If, starting at this theoretical extreme, the ratio $b/a$ is increased, $\phi_s$ increases (assuming $a/\lambda_0$ is above the cut off value for the empty guide) and a series of curves connecting $\phi_s$ (ordinates) with $b/a$ (abscissae) of the nature of those shown in the FIG. 1 is obtained, each curve being for a different value of $a/\lambda_0$, as marked thereon for the curves chosen. It will be observed that each of these curves reaches a fairly flat maximum value and then turns over and that the maximum values of all the curves are approximately equal. The present invention takes advantage of these phenomena. The curves of FIGURE 1 are drawn for the values $$\mu=1, \ 1K1=\frac{1}{2}, \ \epsilon=10$$

According to this invention the radius ratio of a microwave waveguide device of the kind referred to is at least approximately equal to that value of radius ratio at which the curve connecting specific rotation (ordinates) and radius ratio (abscissae) for the normalised guide radius at the central frequency of the intended working band of frequencies is of maximum ordinate value. In other words, referring to FIGURE 1, if the said central frequency is such that the specific rotation-radius curve which applies is the curve X, the radius ratio chosen is some ratio between ratio values such as $R_1$ and $R_2$ between which the slope of the curve X is small—preferably the value R where the slope is zero. In practice a choice of radius ratio within about $\pm 10\%$ of the best value (that at which the appropriate curve has maximum ordinate value) will give acceptably good results though, obviously, the nearer the radius ratio to the best value, the better the results. As will be seen, however, owing to the comparative flatness of the tops of the curves, the selection of the radius ratio is not critical. With a selection of the ratio $b/a$ in accordance with this invention the amount of Faraday rotation, from a device of given length, is approximately independent of frequency over a useful band, i.e. the device becomes wide band.

FIGURE 2 illustrates one embodiment of the invention. In this embodiment a core in the form of a soft ferrite rod 1 of generally cylindrical shape but with pointed or tapered ends is co-axially mounted within a circularly sectioned waveguide 2, the space between the core and the guide having a dielectric filling 3 shown as of solid material. Dielectric materials other than solid—e.g. air—may be used but obviously if the dielectric is not such as will support the rod in position suitable means must be provided for doing so. At either end of the length 2 are guide lengths 4 and 5 of large enough diameter (not necessarily the same in both cases) to propagate waves of the required frequency when empty, i.e. with no ferrite core. The internal radius $a$ of the guide is so chosen with respect to the radius $b$ of the core that the ratio $b/a$ is at least approximately equal to the value at which the curve connecting $\phi_s$ and $b/a$ for the normalised guide radius is of maximum ordinate value at the central frequency of the intended working frequency band. Thus, if the curve is the curve X (the curve for $a/\lambda_0 = 0.25$) the value $b/a$ is chosen somewhere between the lines $R_1$ and $R_2$, preferably at R which corresponds to a radius ratio ($b/a$) of 0.56 and provides a substantially constant value of 1.7 for $\phi$.

For impedance matching purposes tapered guide sections 6 and 7 lead from section 4 to section 2 and from the latter section to section 5 while the filling 3 is tapered away outwards as shown. The tapering is dimensioned in accordance with well known principles to avoid sharp discontinuities.

A probe 8 is exemplified as a means for launching plane polarised $H_{11}$ waves into the guide section 4. A coaxial coil 9 provides the necessary longitudinal magnetic field for the core 1. It is energised from a D.C. source 10 through a screening switch 11 so that the direction of the applied field can be reversed and the direction of rotation as regards polarisation of the plane polarised wave which emerges at the output 12 can be reversed by changing over the switch 11.

The transverse dimensions of the guide are reduced in the region of the ferrite, i.e. over guide length 2, as compared to the transverse dimensions at the end lengths 4 and 5 in order to eliminate liability for the occurrence of undesired modes of propagation.

I claim:

1. A microwave waveguide device of the kind operating in the $H_{11}$ mode of wave propagation utilising Faraday rotation and comprising a length of circularly sectioned waveguide with an inner length of coaxially positioned circularly sectioned gyro-magnetic material the radius ratio $b/a$ being at least approximately equal to that value at which the curve connecting specific rotation $\phi_s$ (ordinates) and radius ratio (abscissae) for the normalised guide radius at the central frequency of the intended working band of frequencies is of maximum ordinate value, $b$, $a$ and $\phi_s$ being as herein defined, and the radius of the waveguide being such that energy will propagate in the $H_{11}$ mode, and means for applying a specific longitudinal magnetic field to said length of gyro magnetic material.

2. A device as claimed in claim 1 wherein the value of the said radius ratio is within $\pm 10\%$ of that which said curve is of maximum ordinate value.

3. A device as claimed in claim 1 wherein the space between the inner wall of the waveguide and the outside of the length of gyro-magnetic material is at least partly filled with solid dielectric material.

4. A device as claimed in claim 1 wherein the length of gyro-magnetic material is in the form of a cylindrical bar length with tapered ends and the length of waveguide is joined at both ends through tapered guide returns to further guides said length of waveguide being of smaller diameter than either of said further guides.

5. A microwave wave guide device of the kind operating in the $H_{11}$ mode of wave propagation utilising Faraday rotation and comprising a length of circularly sectioned waveguide with an inner length of coaxially positioned circularly sectioned gyro-magnetic material which is subjected to a substantially longitudinal magnetic field wherein the radius ratio $b/a$ is at least approximately equal to that value at which the curve connecting specific rotation $\phi_s$ (ordinates) and radius ratio (abscissae) for the normalised guide radius at the central frequency of the intended working band of frequencies is of zero slope, $b$, $a$ and $\phi_s$ being as herein defined.

References Cited in the file of this patent

UNITED STATES PATENTS

| 2,607,031 | Denis et al. | Aug. 12, 1952 |
| 2,909,738 | Davis et al. | Oct. 20, 1959 |
| 2,963,668 | Ohm | Dec. 6, 1960 |

OTHER REFERENCES

Fox et al.: "Bell System Technical Journal," January 1955, pages 22–26.

Bell publication of record, pages 27–31.